United States Patent [19]

Solomon

[11] Patent Number: 5,053,978
[45] Date of Patent: Oct. 1, 1991

[54] AUTOMATIC BOILER ROOM EQUIPMENT MONITORING SYSTEM

[76] Inventor: Jeffrey Solomon, 2402 Neptune Ave., Brooklyn, N.Y. 11224

[21] Appl. No.: 358,255

[22] Filed: May 26, 1989

[51] Int. Cl.⁵ .............................................. G06F 15/74
[52] U.S. Cl. .................................. 364/550; 364/506; 237/8 A; 122/448.1
[58] Field of Search ............... 364/557, 550, 510, 509, 364/506, 505; 237/17, 16, 8 D, 8 A, 7; 122/504.2, 448 R, 448 S, 448 A, 448 B, 446, 448.1, 448.2, 448.3, 448.4

[56] References Cited

U.S. PATENT DOCUMENTS

| | | | |
|---|---|---|---|
| 3,873,817 | 3/1975 | Liang | 364/506 |
| 4,275,382 | 7/1981 | Jannotta | 364/509 X |
| 4,373,662 | 2/1983 | Bassett et al. | 364/505 X |
| 4,403,296 | 9/1983 | Prosky | 364/557 X |
| 4,433,646 | 2/1984 | Zadiraka | 122/504.2 |
| 4,486,625 | 12/1984 | Reinauer et al. | 379/93 |
| 4,487,065 | 12/1984 | Carlin et al. | 364/509 X |
| 4,577,270 | 3/1986 | Sugano et al. | 122/448 R X |
| 4,598,668 | 7/1986 | Bader | 122/504.2 X |
| 4,601,201 | 7/1986 | Oota et al. | 73/304 C |
| 4,602,344 | 7/1986 | Ferretti et al. | 364/509 |
| 4,700,569 | 10/1987 | Michalski et al. | 364/509 X |
| 4,716,536 | 12/1987 | Blanchard | 364/571.04 |
| 4,782,698 | 11/1988 | Wilson | 73/304 C |
| 4,788,648 | 11/1988 | Ferretti et al. | 364/509 |
| 4,864,972 | 9/1989 | Batey et al. | 122/448 B |
| 4,922,861 | 5/1990 | Tsutsui et al. | 122/448 R |
| 4,966,127 | 10/1990 | Martinez, Jr. | 126/362 |

FOREIGN PATENT DOCUMENTS 3133681 3/1983 Fed. Rep. of Germany .
0064433 4/1983 Japan .

Primary Examiner—Parshotam S. Lall
Assistant Examiner—S. A. Melnick
Attorney, Agent, or Firm—Hedman, Gibson, Costigan & Hoare

[57] ABSTRACT

A system for monitoring, processing and storing operating parameters of a boiler room. A sonar gauge for measuring the level of liquid fuel in a storage tank, thermocouples to measure temperatures at varous points in the boiler room, and means to monitor the operating status of boiler room equipment are provided. Means to convert to digital data, store and analyze the digital data, and transmit the digital data to a remote location are provided.

27 Claims, 12 Drawing Sheets

```
*** FUEL CONSUMPTION MONITORING SYSTEM ***
            Version 5.0                        CURRENT DATE: 05-16-1989
                                               CURRENT TIME: 12:51:16

BOILER ROOM EQUIPMENT STATUS:    BOILER #1            BOILER #2

FUEL VALVE STATUS                   ON                   ON
FLAME FAILURE ALARM                 ON                   ON
SMOKE ALARM                         ON                   ON
LOW WATER ALARM                     ON                   ON
HI-FIRE SWITCH                      ON                   ON

**** IS ESTABLISHED ****

STEAM PRESSURE                     904
CONDENSATE TANK TEMPERATURE        904
FUEL OIL TEMPERATURE               904
STACK TEMPERATURE

TANK #1         FUEL OIL LEVEL:    96  INCHES      20031       GALLONS
TANK #2         FUEL OIL LEVEL:    96  INCHES      20031       GALLONS
STACK TEMPERATURE EXCESSIVE                     CHECK COND. TEMPERATURE
```

FIG. 10

AUTOMATIC BOILER ROOM EQUIPMENT MONITORING SYSTEM

FIELD OF THE INVENTION

This invention relates in general to a system for monitoring various selected parameters in a boiler room, and, in particular, to devices which accurately measure the level of fuel present in a storage tank, the temperature of said fuel, the temperature of water in a heating unit, and the like. In addition, means for converting the measured quantities into digital data, means to locally store and analyze said data, and means to transmit said data to a remote location for further analysis and archiving are provided.

DESCRIPTION OF THE PRIOR ART

Boiler rooms in most commercial and residential buildings are replete with functions that need to be accurately monitored and controlled. For example, it is desired to be able to measure the quantity of fuel oil present in a storage tank on a regular basis in order to know when it is necessary to refill the tank. Moreover, when the storage tank is refilled by a commercial distributor, it is important to be able to accurately measure the quantity of fuel oil received and thereby ensure the accuracy of the owner's bill.

In addition to monitoring fuel consumption, it is desired to keep track of certain operating parameters of the boiler room, such as fuel oil temperature, boiler water temperature, domestic hot water temperature, stack temperature, oil valve status, flame failure status, smoke alarm status, low water status, steam pressure status, and high fire status.

It has also been desired to be able to convert the measurements made in a boiler room to digital data signals which can be stored locally, for example, in a computer. In this way, all the measured operating parameters can be analyzed by the owner in order that repairs and adjustments can be made if necessary, as indicated by the data.

Moreover, it is desired to be able to transmit the collected data to a remote central location for further analysis. For example, if the amount of fuel oil reaches a predetermined minimum level due to its consumption, it is desired to automatically alert the commercial fuel distributor that a delivery is required. Additionally, an owner of different buildings can conveniently monitor the operating parameters of each building at one central location, e.g., his home or office.

There are various methods of measuring the level of liquids in a storage tank which have been utilized in the past. The most common method is the use of a manometer. Although relatively inexpensive, this type of measurement technique does not yield a good degree of accuracy since the readings are only approximations. In addition, the readings must be recorded manually, which introduces a chance of operator error.

It has also been common practice to implement a capacitive measurement system in order to measure the amount of liquid in a tank. Typically, a plurality of capacitive electrodes are connected in succession to an elongated probe, to which electrical signals are applied. Since the dielectric constants of the liquid in the tank and the surrounding air space are different, it is possible to detect which electrodes are exposed to the liquid and which are exposed to air. Although this may enable one to roughly determine the level of liquid in the tank, it is disadvantageous insofar as numerous electrodes are required to yield a high resolution of measurement. Moreover, many different size probes would be required to accommodate the different size tanks in use. Both these factors make the system very costly without providing the desired accuracy. U.S. Pat. Nos. 4,716,536 (Blanchard); 4,601,201 (Oota et al.); and 4,782,698 (Wilson) are illustrative of these systems.

U.S. Pat. No. 4,788,648 (Ferretti et al.) describes a system for measuring the liquid level in a tank by monitoring the difference in pressure between the liquid in the tank and the vapor space in the tank. In this system, pressure transducers must reside at both the top and bottom of the tank, therefore the system cannot be installed in an existing tank without shutting down the system and draining the tank. This is both costly and time consuming because the owner of the building and his tenants will be greatly inconvenienced. Moreover, installation of this system would be impossible if the tank is partially or fully buried below grade.

U.S. Pat. No. 4,486,625 discloses a system which determines when the amount of oil in a tank has been depleted to a certain predetermined level, and automatically telephones a computer located at the utility company's office to request delivery of fuel. The length of time that the fuel pump is on is measured by the system, which correlates that time to the amount of fuel that has been pumped, thereby determining when refilling is needed. This system may be useful for approximately determining when a certain level in the tank has been reached, it does not give the user accurate information as to how much fuel has been used, since it cannot accurately measure how much fuel is in the tank at any given time.

Although the systems disclosed by the prior art describe methods of measuring the level of a liquid in a storage tank, none teach a system which can accurately and non-invasively measure the volume of fuel in a tank, and in addition measure other operating parameters of the boiler room of interest such as fuel temperature, boiler water temperature, and the like, locally store such measurements for analysis and archiving, and automatically inform the commercial distributor of fuel oil when replenishment is necessary, as does the present invention.

SUMMARY OF THE INVENTION

The principle object of this invention is to provide a system capable of accurately measuring the level of fuel present in a storage tank by non-invasive means, whereby the volume of said fuel is readily calculable.

Another object of this invention is to provide sensors which measure other operating parameters of the boiler room of interest, such as fuel temperature, boiler water temperature, and the like.

Still another object of this invention is to provide means to collect the fuel and operating parameter measurements and convert said measurements into digital data which can be processed, stored, and analyzed.

Still another object of this invention is to provide means to process, store, and analyze said data in accordance with the specific requirements of the user.

Yet another object of this invention is to provide means to automatically inform a commercial fuel oil distributor that a delivery is requested when the fuel storage tank is in need of replenishment.

Still another object of this invention is to provide means to transmit the measured data to a remote location, whereby multiple monitoring systems at various locations can be polled in a convenient manner.

In furtherance of these and other objects of the present invention, a fuel monitoring system is provided that includes a sonar transmitting device that is specially mounted to the top of a fuel storage tank. The sonar device provides an analog signal which is connected to an interface box resident in the general proximity of the tank.

In addition, thermocouples are inserted into the boiler system at strategic points in order to provide the user with temperatures of interest. Thermocouples in the present invention monitor the fuel temperature, boiler water temperature, stack temperature, and domestic hot water temperature. These thermocouples are connected to the interface box, where analog signals are generated which are proportional to the temperatures at the thermocouples.

In addition to the sonar device and thermocouples, certain circuits present in the boiler room are monitored and each circuit is connected to an isolation relay in the interface box. Circuits which are monitored in this fashion include the oil valve status, flame failure status, smoke alarm, low water cutoff status, steam pressure, and high fire status.

All the collected data is then transmitted to a local computer, which digitizes, stores, analyzes, and archives the data in accordance with programmed software which can be customized to any particular user and system. Additionally, a modem is provided which enables a user with a computer in a remote location to connect to the local computer, allowing the monitoring and collection of the data without the need to visit the local site. This is especially useful for keeping track of monitoring systems resident in different buildings.

An autodialer circuit which is optionally part of the existing heating plant can be triggered by the local computer, which allows a local service contractor to be alerted to the fact that his services are required (e.g. fuel low, repairs needed, etc.). In the alternative, the modem can be used to facilitate this function.

These and other features, objects, and advantages of the present invention will become apparent with reference to the following description of the drawings.

BRIEF DESCRIPTION OF THE DRAWINGS

FIG. 10 is a typical screen display of the computer of FIG. 1.

DESCRIPTION OF THE PREFERRED EMBODIMENT OF THE INVENTION

Figure 1:
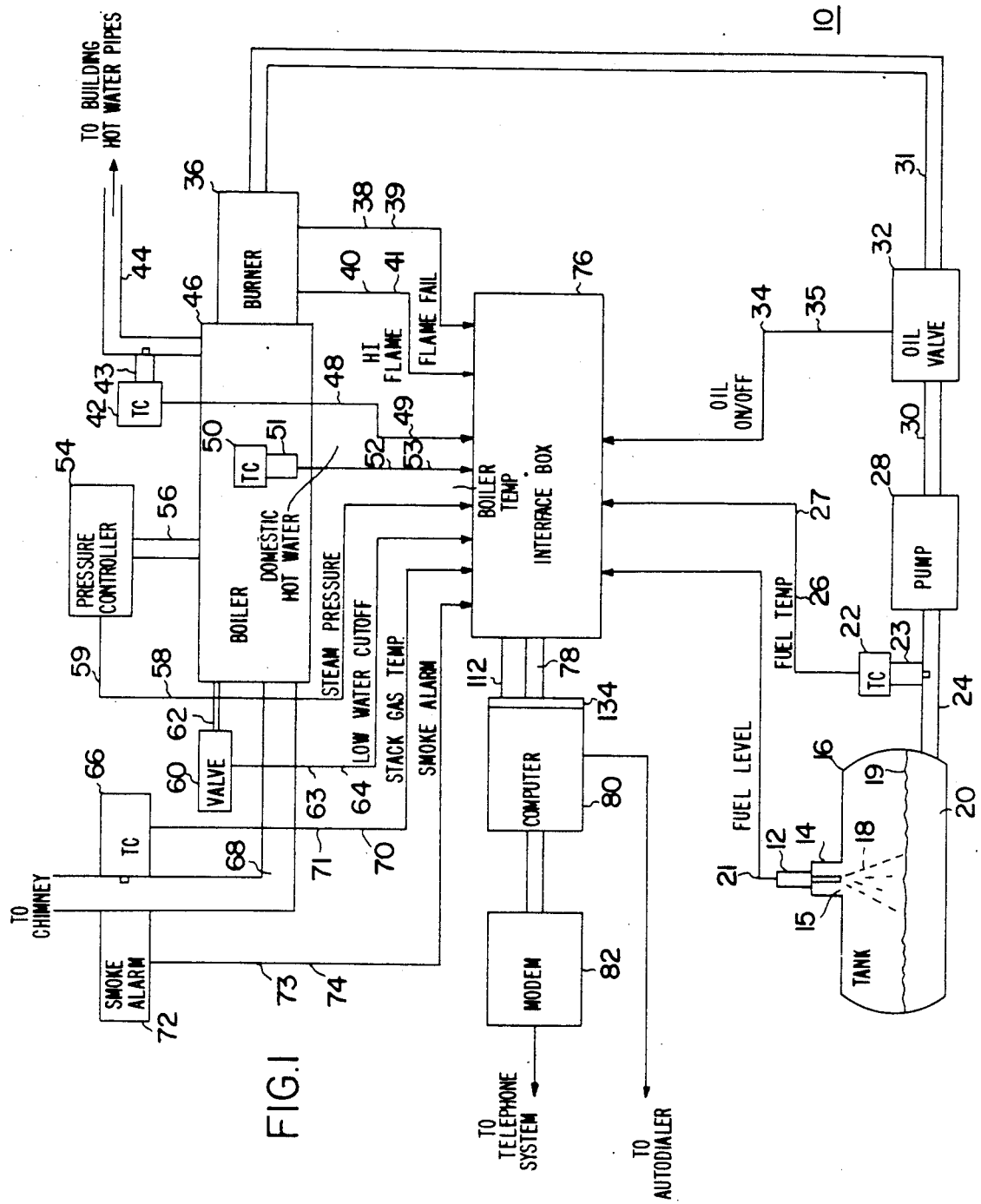
FIG. 1 is a block diagram of the fuel monitoring system as installed in a typical boiler room.

Referring generally to FIG. 1, the fuel monitoring system 10 is comprised essentially of a sonar gauge 12, a mounting plate 14, a fuel thermocouple 22, a fuel thermocouple well 23, a domestic hot water thermocouple 42, a domestic hot water thermocouple well 43, a boiler water thermocouple 50, a boiler water thermocouple well 51, a stack gas thermocouple 66, thermocouple wire pairs 27, 49, 53, and 71, and interface box 76, a flat ribbon cable 78, a computer 80, a computer I/0 board 134, and a modem 82.

Components of the existing boiler room, or heating plant, are designated generically as a fuel tank 16, a fuel pump 28, an oil valve 32, a burner 36, a boiler 46, a pressure controller 54, a water cutoff valve 60, a stack 68, a smoke alarm 72, fuel pipes 24, 30, and 31, a domestic hot water pipe 44, a steam pressure pipe 56, and a water cutoff pipe 62. Boiler room equipment inevitably varies according to a particular installation, and modifications to the fuel monitoring system 10 can be made in accordance with a particular heating plant and still be kept within the scope of this invention. Moreover, a heating plant component need not be of specific manufacture, as the fuel monitoring system 10 described herein is readily adaptable to different types of equipment.

Figure 2:
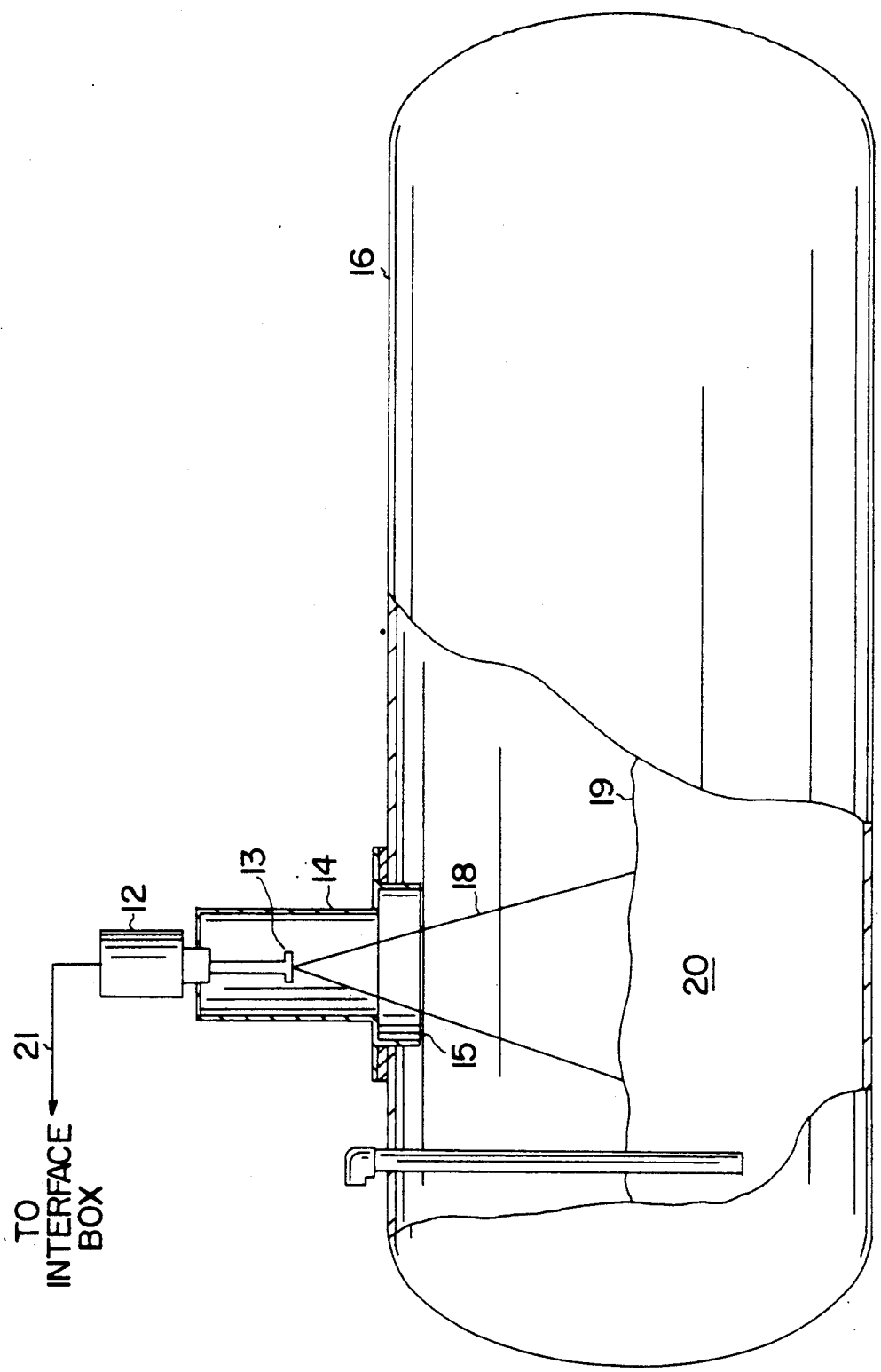
FIG. 2 is a partial sectional elevational view of the sonar device and the monitoring arrangement for the sonar device in the storage tank.
Figure 3:
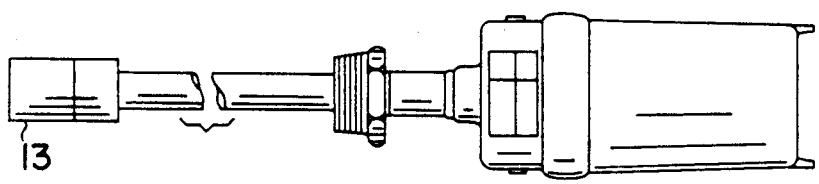
FIG. 3 is a perspective view of the sonar device of FIG. 2.

Referring additionally to FIGS. 2 and 3, the sonar gauge 12 is attached to the mounting plate 14 which is fastened over an opening 15 of the fuel tank 16. Most fuel tanks in use have a pre-cut manhole opening located on the top of the tank with a lid attached thereto. The mounting plate 14 is designed to replace the existing manhole cover, thereby eliminating the need for customizing the tank and allowing convenient installation of the fuel monitoring system 10 without interruption of service.

Although various types of sonar gauges can be implemented in the present invention, practice has taught that the use of an OMEGA LV-200 continuous level transmitter yields great accuracy. This particular device transmits an ultrasonic beam 18 from a sensor 13 with a conical 12° (typical) angle to the surface level 19 of the fuel 20 resident in the fuel tank 16. Echoes of the transmitted ultrasonic beam 18 are detected by the sonar gauge 12, and an analog fuel level signal 21 indicative of the distance from the sonar gauge 12 to the surface level 19 of the fuel 20 is generated. The analog fuel level signal 21 ranges from 4 to 20 mADC and is transferred to the computer 80 via the interface box 76 for processing. The computer 80 has stored internally the dimensions of the fuel tank 16, and can thereby calculate the level as well as the volume of fuel 20 present at that time.

In order that the sonar gauge 12 operate properly, it is necessary that it not come into contact with the fuel 20 in the fuel tank 16. Moreover, the sensor 13 must be ten inches away from the highest point that the fuel 20 may reach, for calibration purposes. Therefore, the sonar gauge 12 is mounted to the mounting plate 14 such that the sensor 13 is ten inches from the top of the fuel tank 16. This spacing leaves enough clearance so that if the tank is entirely filled, the sensor 13 will not be submerged in the fuel 20. If the sonar gauge 12 is mounted such that the sensor 13 is more than ten inches above the fuel tank 16, the ultrasonic beam 18 may be interferred with by the sides of the mounting plate 14.

Figure 4:
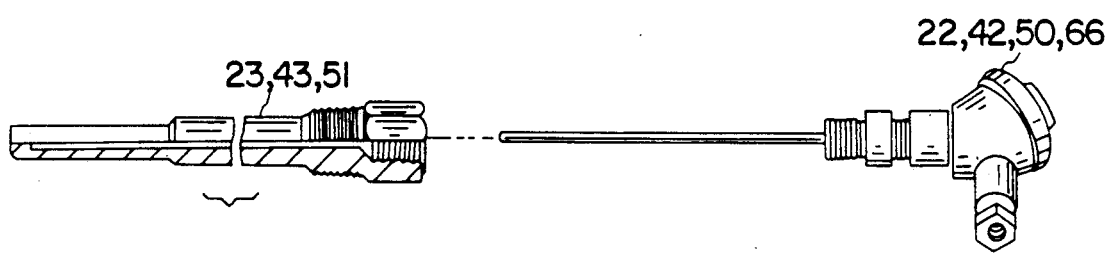
FIG. 4 is an exploded view of a thermocouple well utilized in FIG. 1.

Referring additionally to FIG. 4, a fuel thermocouple well 23 is inserted into a fuel pipe 24 which connects the fuel tank 16 to the fuel pump 28. The fuel pump 28 draws fuel from the fuel tank 16 for use by the heating plant. The fuel thermocouple 22 is threaded and inserted into the fuel thermocouple well 23. Once the fuel thermocouple well 23 has been permanently inserted into the fuel pipe 24, the fuel thermocouple 22 can be removed for replacement or servicing without interruption of the heating plant. In the preferred embodiment, the OMEGA NB2 type thermocouple has provided the best results.

As is well known in the art, thermocouples provide a potential difference that is a function of temperature. A fuel temperature signal 26 representing the potential difference as measured by the fuel thermocouple 22 is input into the interface box 76, via a thermocouple wire pair 27, where it is amplified for further processing. The way in which this amplification is performed will be further discussed below.

The remaining thermocouples utilized in the fuel monitoring system 10 operate in a like manner. The domestic hot water thermocouple well 43 is inserted into the domestic hot water pipe 44, which is connected to the boiler 46 and provides domestic hot water to the faucets throughout the building. The domestic hot water thermocouple 42 is threaded and inserted into the domestic hot water thermocouple well 43, thereby providing a domestic hot water temperature signal 48 to the interface box 76 via a thermocouple wire pair 49, indicative of the temperature of the domestic hot water provided to the tenants of the building. Monitoring this temperature enables the building owner to determine if repairs are needed by observing that the domestic hot water temperature has dropped below a certain minimum level (e.g. 100° F.), yet has not reached the critical point where there is no hot water at all. By effecting repairs before the hot water has been depleted, inconvenience to the tenants of the building is minimized.

A third thermocouple, the boiler water thermocouple 50, is utilized to measure the temperature of the water in the boiler 46. If the temperature of the domestic hot water is critically low as measured by the domestic hot water thermocouple 42, knowledge of the temperature of the water in the boiler 46 will aid in troubleshooting and locating the source of the problem. The installation of the boiler water thermocouple 50 is performed in a similar manner as the fuel thermocouple 22 and the domestic hot water thermocouple 42; the boiler water thermocouple well 51 is inserted into the boiler 46, the boiler water thermocouple 50 is threaded and inserted therein, and a boiler water temperature signal 52 is sent to the interface box 76 via a thermocouple wire pair 43 for amplification and processing.

The temperature of the gases expelled via the stack 68 is measured by the stack gas thermocouple 66. A stack gas temperature signal 70 is transmitted from the stack gas thermocouple 66 to the interface box 76 via a thermocouple wire pair 71. By monitoring the temperature of the gases expelled via the stack 68 in this manner, insight into the efficiency of the heating plant is obtained.

In addition to the fuel level measurements made by the sonar gauge 12 and the temperature measurements made by the thermocouples 22, 42, 50 and 66 as recited, certain status conditions of the heating plant are kept track of by the fuel monitoring system 10. These status conditions provide a simple "on/off" indication to the interface box 76 relating to the parameter being monitored. For example, the oil valve 32, which operates to control the flow of fuel (oil) from the fuel pump 28 to the burner 36, is resident between the fuel pipes 30 and 31. By connecting a wire 35 from the oil valve 32 to the interface box 76, an oil on/off signal 34 is provided for monitoring and processing. The wire 35 can be connected to any point inside the oil valve 32 such that the wire 35 is energized when the oil valve 32 is on, and de-energized when the oil valve 32 is off. The choice of connection point will vary according to the particular oil valve resident in the existing heating plant and is not critical to the operation of the fuel monitoring system 10, as long as the oil on/off signal 34 indicates the operating status of the oil valve 32 correctly.

In addition, the status of the flame of the burner 36 is monitored by attaching wires 39 and 41 from the control wiring of the burner 36 to the interface box 76. In this manner, a flame fail signal 38 and a high flame signal 40 are made available to the interface box 76. When the wire 39 is energized, the flame fail condition is "on", which indicates that the flame of the burner 36 has failed. Moreover, when the wire 41 is energized, the high fire condition is on; when the wire 41 is not energized, the burner 36 is in the low fire condition. Monitoring these status conditions is useful insofar as the computer 80 can be programmed to automatically dial a service contractor via the modem 82 if it recognizes a failure of the flame in the burner 36 as indicated by an "on" condition of the flame fail signal 38. Once again, the heating plant can be repaired as soon as a failure is automatically detected, in order to minimize inconvenience to the tenants of the building.

There are two status conditions of the boiler 46 which are measured by the preferred embodiment of the present invention; the steam pressure and the low water cutoff indicator. The pressure controller 54, which resides at the top of the steam pressure pipe 56, is connected by a wire 59 to the interface box 76 to provide a steam pressure signal 58. The wire 59 will be energized, indicating the steam pressure signal in the "on" condition, when the steam pressure of the boiler 46 exceeds a predetermined value. Knowledge of this operating parameter helps the owner to determine if the system is cycling properly.

A low water condition in the boiler 46 is sensed by the fuel monitoring system 10 by connecting a wire 63 from the low water valve 60 to the interface box 76. The low water valve 60 is attached to the boiler 46 via the low water cutoff pipe 62 such that the level of the low water valve 60 is the same as the water level desired to be monitored. In this way, if the water level of the boiler 46 reaches this low point (possibly due to a leak), the low water valve 60 is energized. By connecting the wire 63 to the proper point in the low water valve 60, the low water cutoff signal is switched into the "on" condition, and the low water condition is automatically detected.

Attached to the stack 68 is the smoke alarm 72, which is tripped in the event excessive smoke is detected from the boiler 46. This condition is detected by the interface box 76 by connecting it to the necessary point in the smoke alarm 72 with a wire 73. In this way, if the smoke alarm is tripped, the wire 73 is energized, which puts the smoke alarm signal 74 in the "on" condition. A service contractor can then be automatically dialed by the existing autodialer or the modem 82 so that the required attention may be given.

The interface box 76 is utilized to collect the status signals recited above and convert said signals to digital format. In addition, the thermocouple signals are amplified and channelled to the computer 80 for digitization and processing. Moreover, the interface box 76 provides the means for the user to control certain parameters of the fuel monitoring system 10 via the computer 80.

Figure 5:
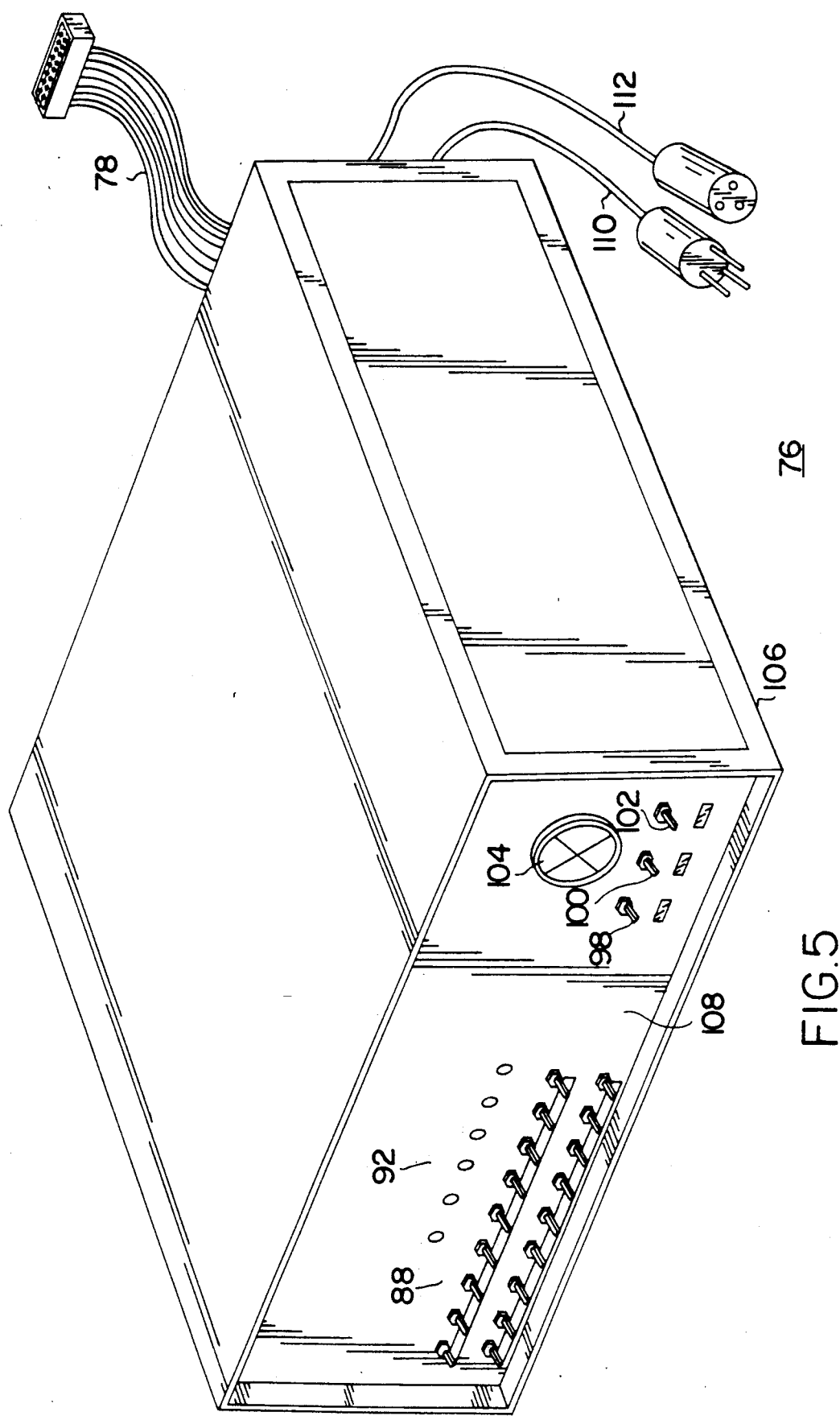
FIG. 5 is a perspective view of the interface box of the fuel monitoring system of FIG. 1.
Figure 6:
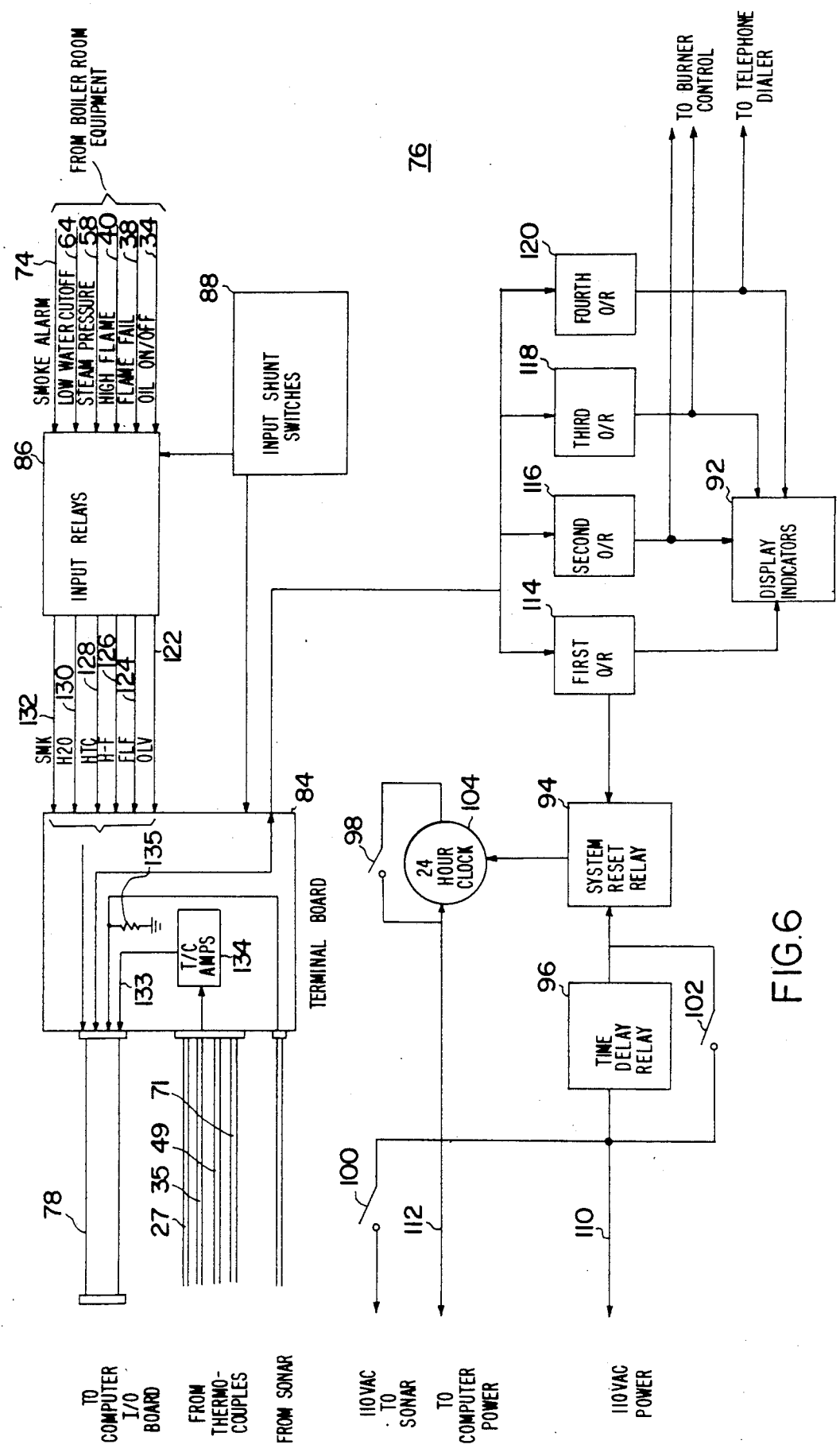
FIG. 6 is a block diagram of the interface box of FIG. 5.

Referring to FIGS. 5 and 6, the interface box 76 is comprised essentially of a terminal board 84, input relays 86, input shunt switches 88, display indicators 92, a system reset relay 94, a time delay relay 96, a clock bypass switch 98, a gauge power switch 100, a time delay bypass switch 102, a twenty-four hour clock 104, a housing 106, a front panel 108, an interface power cord 110, a computer power cord 112, a first output relay 114, a second output relay 116, a third output relay 118 and a fourth output relay 120.

The front panel 108 has attached thereto all user controls and displays which function as follows.

The input shunt switches 88 are three-position switches which are used to shunt unused inputs to the terminal board 84 to either +5VDC or ground as desired. When left in the center-off position, the input shunt switch 88 does not affect the particular input channel it is connected to. However, if a particular input channel is not in use, it is necessary to shunt that channel to either +5VDC or ground to avoid the input "float" which results from an undriven input to the terminal board 84. Since such a float may interfere with the programmed data analysis, the setting of the input shunt switch 88 which corresponds to an unused input to either +5VDC or ground is desired. Unused inputs can either be spare inputs designed into the terminal board 84 for future expansion in case additional parameters need to be monitored, or an input which normally has a sensor attached to it but which is open due to servicing or replacement of such sensor (e.g. repair of the sonar gauge 12).

Figure 8:
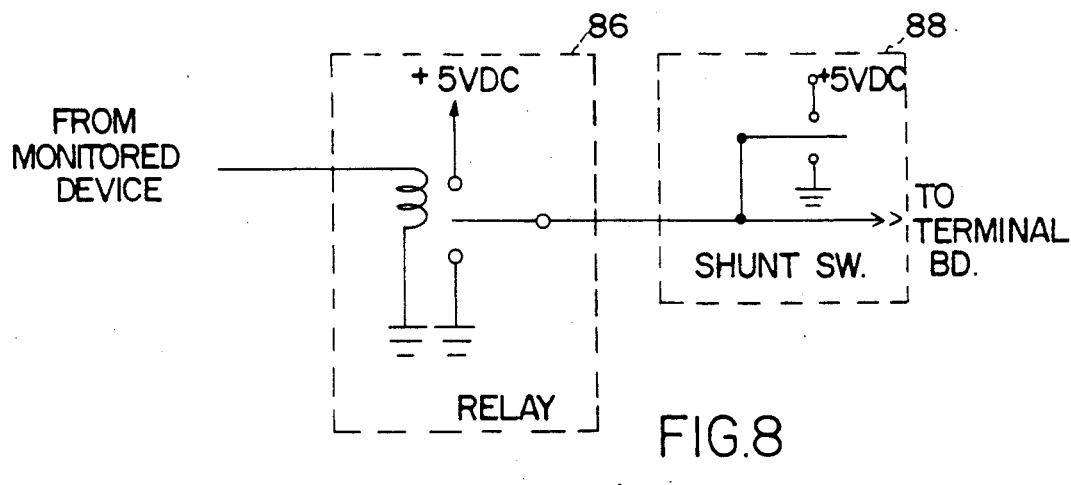
FIG. 8 is a schematic diagram of a typical relay/shunt switch circuit of the interface box of FIG. 5.
Figure 9A:
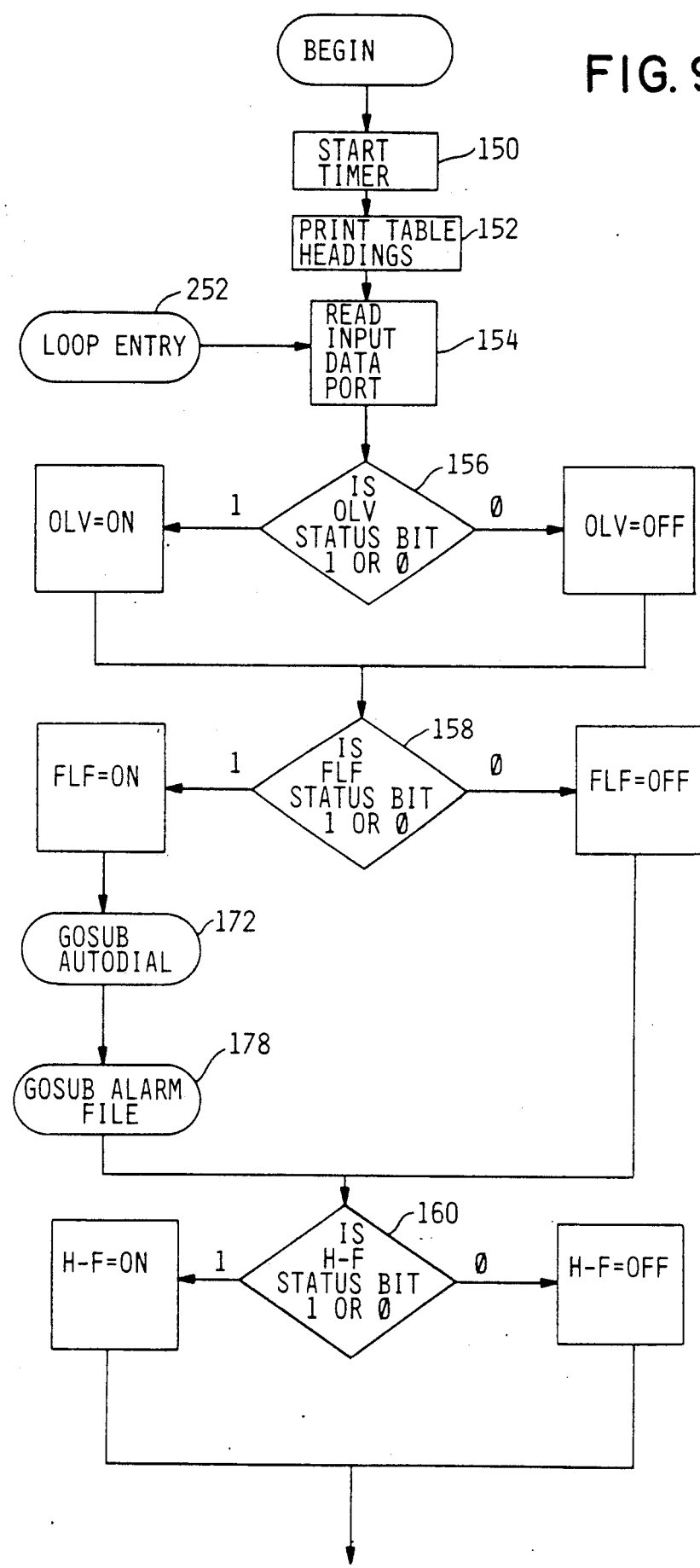
FIGS. 9A-9D are a flowchart of the software programmed into the computer of FIG. 1.
Figure 9B:
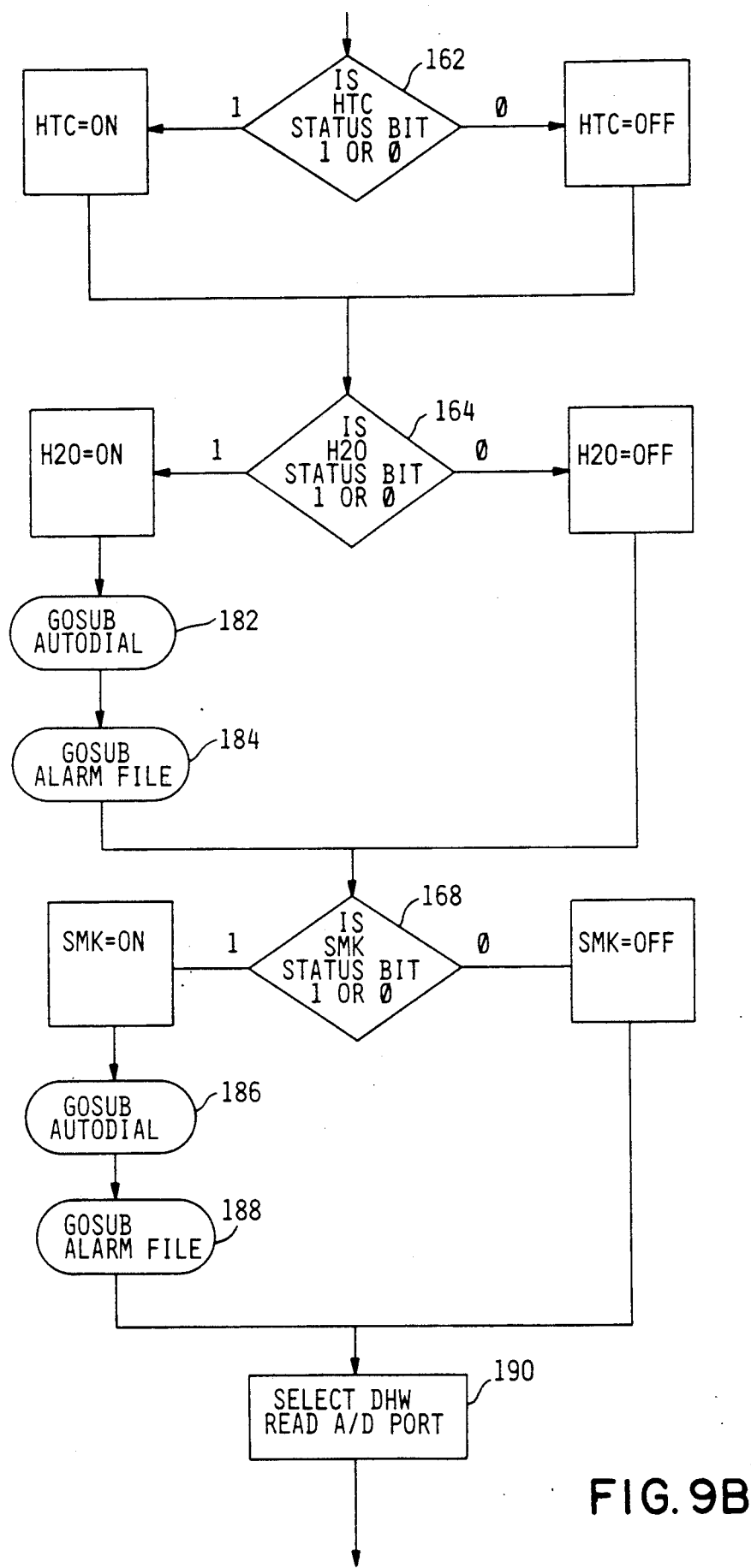
Figure 9C:
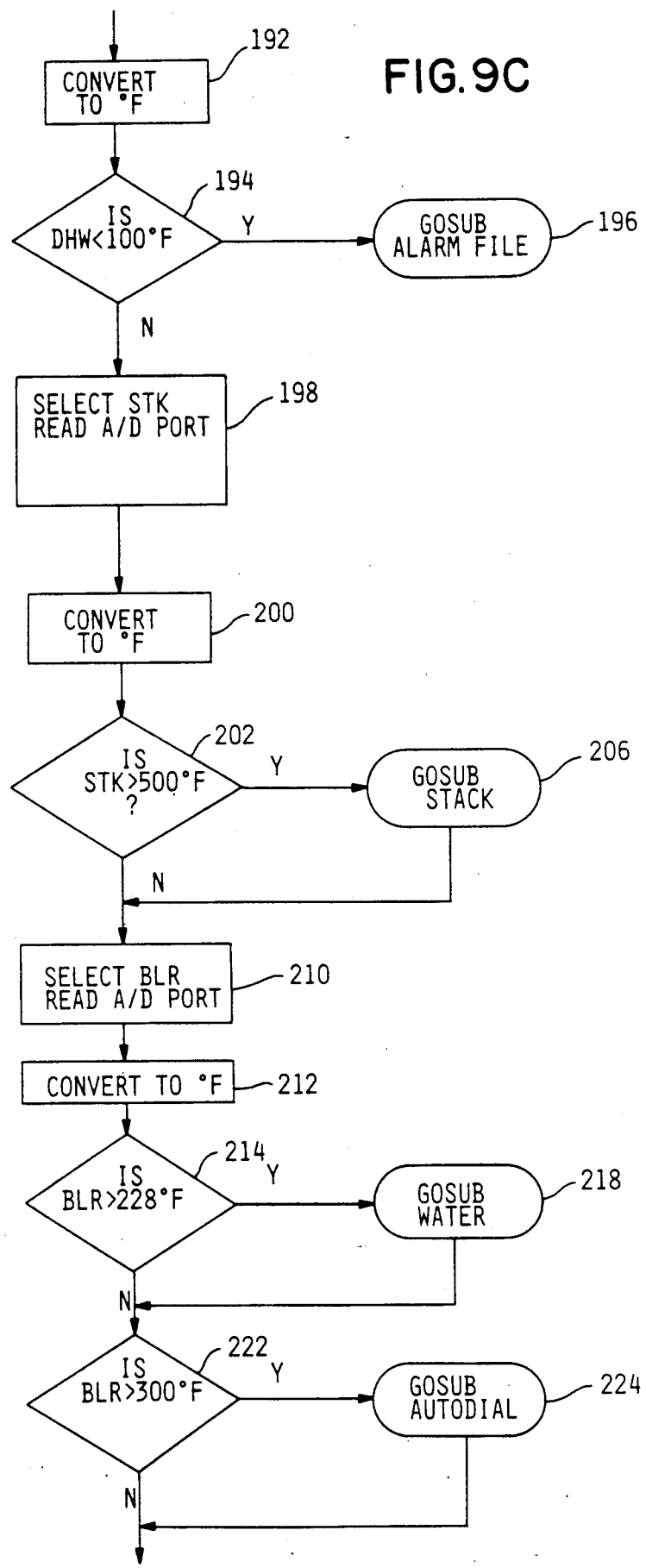
Figure 9D:
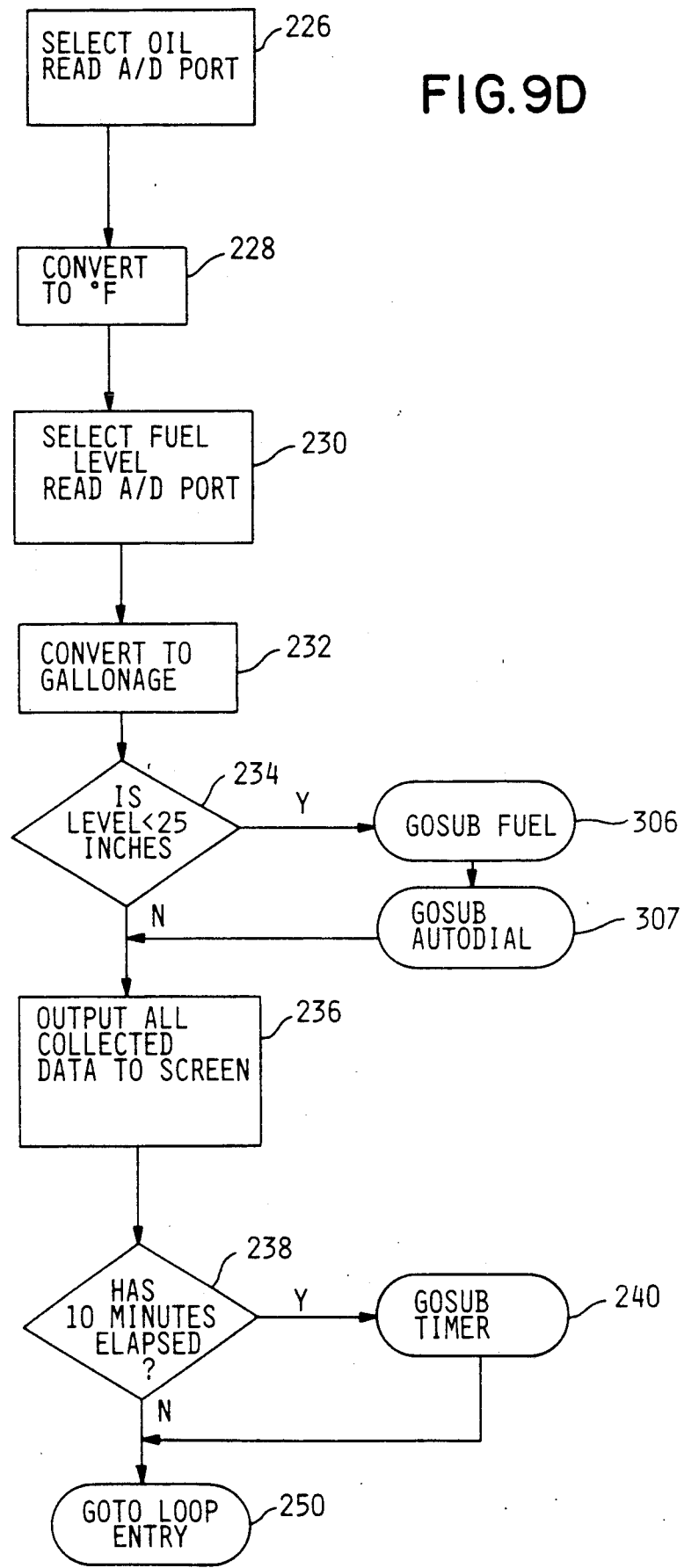
Figure 9E:
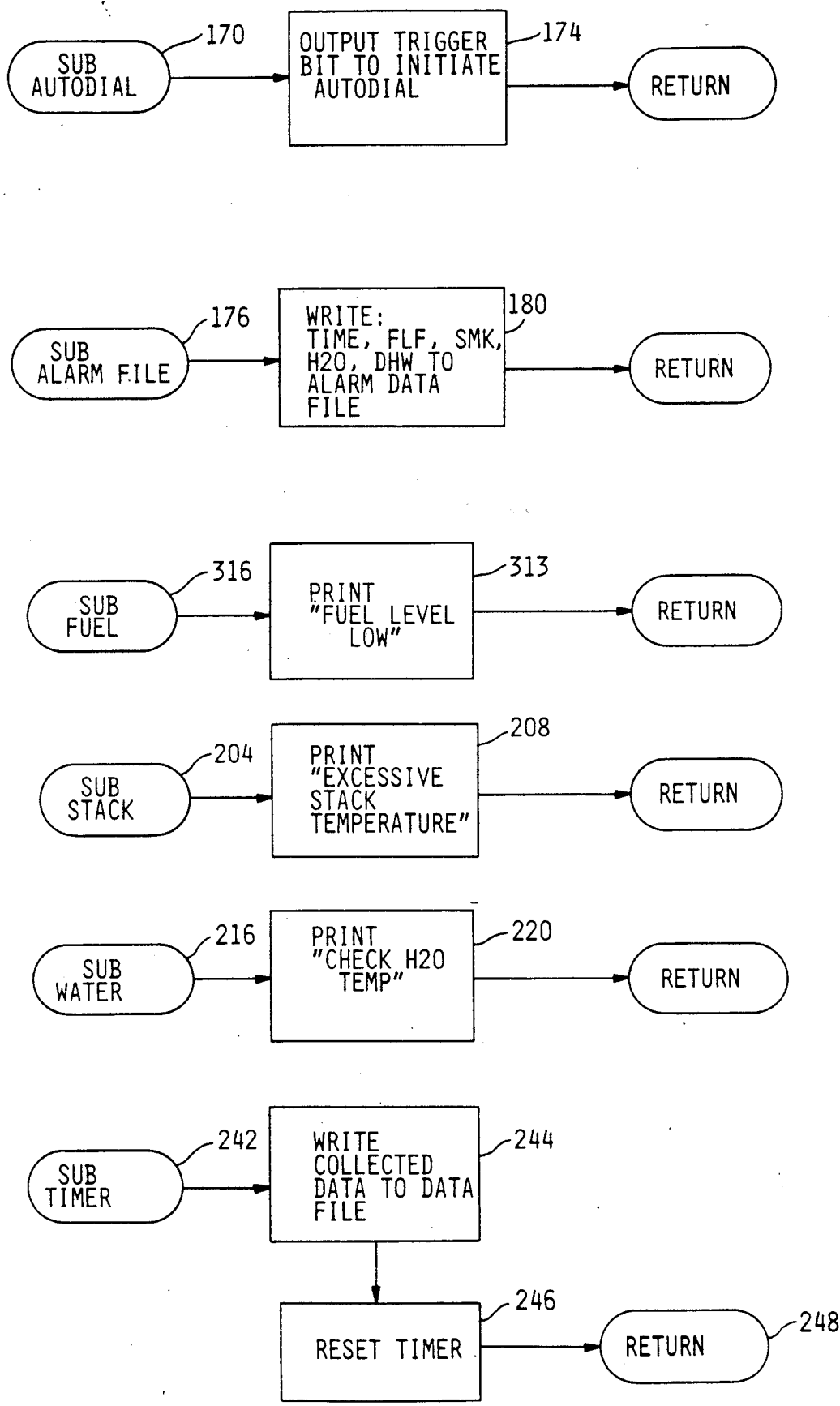

In the preferred embodiment, the terminal board 84 has eleven spare inputs, in addition to the inputs dedicated to the sonar gauge 12, the oil on/off signal 34, the flame fail signal 38, the high flame signal 40, the steam pressure signal 58, the low water cutoff signal 64, and the smoke alarm signal 74; for a total of eighteen input shunt switches 88 on the front panel 108. Therefore, the eleven input shunt switches 88 which are connected to the eleven spare inputs are set to either ground or +5VDC, while the seven input shunt switches 88 which are connected to the utilized inputs are left in the center-off position. Reference to FIG. 8 is illustrative of the connection of a typical input shunt switch 88 to a utilized input channel.

The gauge power switch 100 is used to control the 110 VAC input power to the sonar gauge 12. By having front panel control of the power to the sonar gauge 12, the fuel monitoring system 10 can remain powered up while the sonar gauge 12 is serviced or replaced.

The 24-hour clock 104 is implemented to automatically shut down power to the system for an interval set up by the user. In the preferred embodiment, a DAYTON 24520 timer is used to accomplish this task. This particular model allows the user to interrupt power in separate or consecutive 2 hour intervals at any time during the week. It is desired to be able to automatically shut down the fuel monitoring system 10 in this way in order to reduce wear and tear on the system. Since the system can be set to shut down at any time, the user can determine at which time the readings taken are less critical than others, (e.g. 2 a.m.–4 a.m. Sunday morning) and program the 24-hour clock 104 accordingly. Moreover, in the event of a mechanical failure or software lockup, the powering down and subsequent powering up will reset the system automatically, acting as a fail safe mode of operation.

The clock bypass switch 98 will allow the user to bypass the pre-set power down times by shunting power around the 24-hour clock 104. This is useful if it is desired to eliminate or suspend the recycling of the system via the 24-hour clock 104.

The system reset relay 94, the time delay relay 96, the first output relay 114, and the time delay bypass switch 102 operate together to enable the computer 80 to reset itself in accordance with a preprogrammed event. For example, if certain data measurements are out of range, the computer 80 can be programmed to perform the system reset.

The first output relay 114 is connected to the terminal board 84 such that an output bit from the computer 80 will operate to energize the relay 114 when so programmed. When the computer 80 instructs the first output relay 114 via the terminal board 84 to energize, the first output relay 114 energizes the system reset relay 94 so that power is removed from its output terminal. As such, the power to the computer 80, as provided for by the computer power cord 112, is removed, turning off the computer 80. This results in a de-energizing of the first output relay 114, which then de-energizes the system reset relay 94. The time delay relay 96 then provides a two-minute time delay before power is restored to the computer 80 via the computer power cord 112. The IBM PC-XT, which is used as the computer 80 in the preferred embodiment, requires a short recycle time after power is removed before power can be reapplied. The two minute delay provided here allows for this; if a longer delay time is required, the time delay relay 96 can be changed accordingly.

If it is desired to bypass the time delay relay 96, the time delay bypass switch 102 can be switched on.

The display indicators 92 are connected to the output relays 114, 116, 118 and 120, such that each display indicator 92 corresponds to each relay. When an output relay is energized by the computer 80, the display indicator 92 corresponding to that particular relay is illuminated, allowing an operator to determine the status of the relay by merely viewing the first panel 108. For example, when the first output relay 114 is energized as described above, the display indicator 92 associated with said relay is illuminated, indicating that the system is being reset. Moreover, it is useful to be able to visually know if the output relays are in fact being energized by the computer 80 as a debug tool. In the preferred embodiment, six display indicators 92 are used, as seen in FIG. 5. Although only four output relays are present, two display indicators 92 are provided as spares, in case of future expansion.

The second output relay 116, third output relay 118, and fourth output relay 120 are also controlled by output signals from the computer 80. The second and third output relays 116 and 118 are connected to an external burner control circuit resident at the burner 36. In this manner, the controls for burner 36 can be overridden by the computer 80 as desired. The fourth output relay 120 is used to trigger a standard autodialer system that may be found in most commercial applications. This allows a servicing company to be alerted to the fact that repairs or refueling is necessary. In the alternative, the modem 82 can be used by the computer 80 for the same purpose. However, since many boiler rooms already have existing autodialers, the implementation of relay controlled dialing may be more economical.

The input relays 86 are connected to the oil on/off signal 34, the flame fail signal 38, the high flame signal 40, the steam pressure signal 58, the low water cutoff signal 64, and the smoke alarm signal 74, such that the presence of a 110 VAC signal on the input relay control side from said signals produces a +5VDC digital signal on the load side. Thus, for example, when the oil on/off signal 34 is energized with 110 VAC by the oil valve 32, its corresponding input relay will produce a +5VDC level on OLV signal 122. The OLV signal 122 is then input to the computer 80 via the terminal board 84 for storage and processing. In addition to providing voltage conversion, the input relays 86 act to isolate the boiler room equipment from the digital electronics of the computer 80, which is desired due to the inherent electrical noise present in the heating plant environment. Although different types of relays can be used to accomplish these functions, practice has taught that the DAYTON 5X824E provides the best results. FIG. 8 illustrates a representative relay/shunt switch circuit.

The terminal board 84 is used to provide an interface between the data signals gathered by the fuel monitoring system 10 and the computer 80. The terminal board 84 is comprised essentially of thermocouple amplifier circuits 134, which function to amplify the inputs from the thermocouple wire pairs 27, 35, 49 and 71 into signals 133 which can be processed by the computer 80. An ANALOG DEVICES AD594 Monolithic Thermocouple Amplifier with Cold Junction Compensation is used in the preferred embodiment, although other equivalent devices may be used as desired. This integrated circuit operates to produce a 10 mv/degree Celcius output directly from the thermocouple signals. In this manner, an analog voltage level directly proportional to the temperature of the parameter being measured is input to the computer 80 for digitization, storage, and processing.

The terminal board 84 also provides simple point to point connections for the OLV signal 122, the FLF signal 124, the H-F Signal 126, the HTC Signal 128, the H20 Signal 130, and the SMK Signal 132. Moreover, the data signals which control the four output relays 114, 116, 118 and 120 are provided from the computer 80 via the terminal board 84.

The analog fuel level signal 21 which ranges from 4 to 20 ma, is connected to one end of a resistor 135 in order to produce a voltage to which it is directly proportional. The voltage signal produced can then be input to the computer 80 for digitization and storage therein. Ideally, the resistor 135 is 250 ohms and is connected from the analog fuel level signal 21 to ground.

Although various circuit boards can be used to implement these functions, the MICRO R&D MW-150 Terminal Board is used in the preferred embodiment. The MW-150 provides four thermocouple amplifier circuits implementing the ANALOG DEVICES AD594 and can be customized (for example, to add the resistor 135) to a user's needs. The MW-150 utilizes a standard 37-pin I/0 connector, to which the ribbon cable 78 is easily attached.

The computer 80 is implemented in the preferred embodiment by an IBM PC-XT. This particular model is inexpensive yet yields superior, reliable results.

Figure 7:
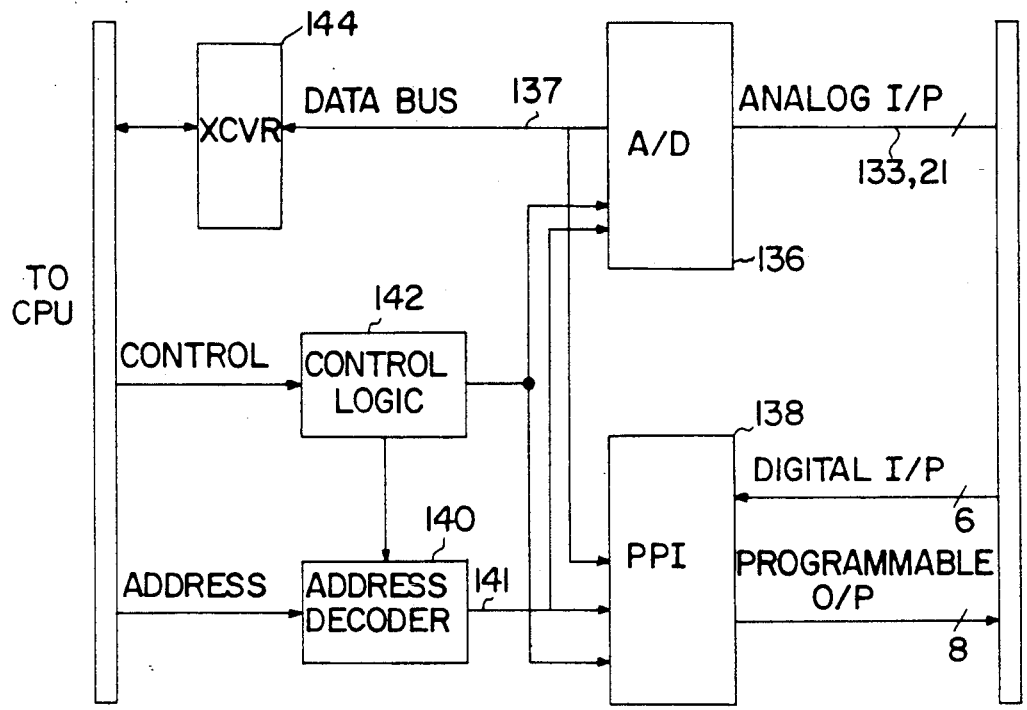
FIG. 7 is a block diagram of the I/o board resident in the computer of FIG. 1.

The computer 80 has installed therein the computer I/0 board 134, which provides several interface functions. Referring to FIG. 7, the computer I/0 board 134 is comprised essentially of an analog digital (A/D) circuit 136, a programmable peripheral interface (PPI) 138, an address decoder 140, a control logic circuit 142, and a data transceiver 144.

The A/D circuit 136 receives the amplified thermocouple signals 133 and the analog fuel level signal 21 from the terminal board 84 of the interface box 76, and multiplexes one of said signals in accordance with an address 141 provided by the address decoder 140. The multiplexed analog signal is then converted into an eight bit digital signal 137 which can be read by the CPU of the computer 80. In this manner, the CPU can read a digital word which represents the selected parameter in accordance with the address provided. The PPI 138 operates to latch the OLV Signal 122, the FLF Signal 124, the H-F Signal 126, the HTC Signal 128, the H20 Signal 130, and the SMK Signal 132, which are already in discrete digital form due to the conversion at the input relays 86. These signals are then read simultaneously by the CPU in accordance with the address 141 as provided.

In addition, the PPI 138 provides output signals from the CPU to the output relays 114, 116, 118 and 120 for control of external circuits as discussed previously.

Practice has taught that these functions can best be realized by the use of the MICRO R&D M-W 200 I/0 card. This particular board provides a NATIONAL SEMICONDUCTOR ADC0817 A/D Converter with 16-channel Multiplexer which implements the functions of the A/D Circuit 136, an INTEL 8255 Programmable Peripheral Interface to implement the functions of the PPI circuit 138, and standard LS type logic components to implement the functions of the control logic circuit 142, the address decoder 140, and the data transceiver 144.

Referring to FIG. 9, a flowchart which illustrates the software implemented in the computer 80 in the preferred embodiment operates as follows.

After the computer 80 is turned on, an internal timer is started at step 150. Next, the table headings are printed to the screen at step 152, as illustrated by FIG. 10.

The input data port is then read by the computer 80 at step 154. Steps 156, 158, 160, 162, 164, and 168 analyze the status bits OLV, FLF, H-F, HTC, H20, and SMK, respectively. In each case, if a 0 is detected, the status bit is OFF. If a 1 is detected, the status bit is ON. Moreover, when certain status bits are detected as ON, service subroutines are called by the main program as further described.

If FLF is detected ON, indicating a flame failure, an AUTODIAL subroutine 170 is called by step 172. In the AUTODIAL subroutine 170, a data byte is output at step 174 to trigger the fourth output relay 120, which in turn triggers an automatic dialing circuit. This will operate to inform a service contractor that service or repairs need to be performed at the heating plant.

After the AUTODIAL subroutine 170 has been executed, an ALARMFILE subroutine 176 is called by step 178. The ALARMFILE subroutine 176 writes the FLF, SMK, H20, and DHW status bits to a data file at step 180 for storage purposes.

If the H20 status bit is detected ON, indicating a low water cutoff condition in the boiler 46, the AUTODIAL subroutine 170 and the ALARMFILE subroutine 176 are called by steps 182 and 184, respectively. These subroutines perform the same functions as previously discussed. In addition, a detection of the SMK status bit in the ON position, indicating a smoke alarm condition, will cause the same subroutines to be executed at steps 186 and 188.

After all the status bits have been read and analyzed, step 190 selects the DHW input to the A/D circuit 136 via the address decoder 140. The data bus 137 is then read via the transceiver 144 and the digital data is converted from degrees Celcius to degrees Fahrenheit at step 192. If the DHW is less than 100° F. as analyzed by step 194, the ALARMFILE subroutine 176 is called by step 196.

Similarly, the STK input is selected and the A/D port is read at step 198, the data is converted to degrees Fahrenheit at step 200, and a comparison is made at step 202. If the STK temperature is greater than 500° F., the STACK subroutine 204 is called at step 206. This initiates step 208, which causes "EXCESSIVE STACK TEMPERATURE" to be printed to the screen which flags a user that the stack temperature should be investigated.

The BLR input is then selected and the A/D port is read at step 210, and the data is converted to degrees Fahrenheit at step 212. If the BLR temperature is greater than 220° F. as determined by step 214, the WATER subroutine 216 is called by step 218. This causes step 220 to print "CHECK H20 TEMP" at the screen, alerting the user to check the boiler water temperature. At step 222, the BLR temperature is again analyzed if it is greater than 300° F., the AUTODIAL subroutine 170 is called by step 224.

Next, the OIL input is selected and the A/D port read at step 226; and the data is converted to degrees Fahrenheit at step 228. At step 230, the FUEL LEVEL input is selected and the A/D port is read. This data is converted to gallons at step 232 by a formula which utilizes the pre-programmed dimensions of the fuel tank 16. At step 234, the FUEL LEVEL is analyzed; if it is less than 25 inches, the FUEL subroutine 316 is called by step 306. This causes step 318 to print "FUEL LEVEL LOW" to the screen, alerting the user to this condition. The AUTODIAL subroutine 170 is then executed by step 307, which operates to inform the service contractor that his services are needed.

Finally, the data that has been collected is output to the screen at step 236. Reference to FIG. 10 illustrates this format.

At step 238, the timer is checked to see if 10 minutes has elapsed from the start of the cycle. If 10 minutes has elapsed, the TIMER subroutine 242 is called at step 240. This causes step 244 to write all the collected data to a file for storage. Step 246 then resets the internal timer, and step 248 returns control back to step 250. The data cycle is then started again by entering through step 252.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A system for automatically monitoring, processing, and storing operating parameters of a boiler room comprising:
   (a) means for detecting a level of liquid fuel in a storage tank and generating a fist set of electrical signals indicating the level;
   (b) means for measuring temperatures at various locations in the boiler room and generating a second set of electrical signals indicative of the temperatures;
   (c) means for monitoring the operating status of a plurality of conventional boiler room equipment and generating a third set of electrical signals indicative of the monitored operating status;
   (d) computer means located in the boiler room for selecting from the first, second and third set of electrical signals generated and internally processing and storing the selected electrical signals in accordance with a set of internally programmed instructions; and
   (e) means for transmitting the processed signals stored in the computer means from the computer means located in the boiler room to a computer located in a remote location.

2. A system as in claim 1 wherein the means for detecting the level of liquid in the storage tank comprises a sonar device mounted in the storage tank comprising:
   (a) means for transmitting an ultrasonic signal in a direction generally perpendicular to the surface of the liquid fuel in the storage tank;
   (b) means for detecting an echo of the transmitted ultrasonic signal from the surface level of the liquid fuel in the storage tank;
   (c) means for electrically measuring a time differential between transmission of the ultrasonic signal and the detection of the echo of the ultrasonic signal; and
   (d) means for generating the first electrical signal indicative of the level of the liquid fuel in the storage tank in accordance with the measured time differential.

3. A system as in claim 2 wherein the first electrical signal consists of electrical current the value of which is indicative of the level of the liquid fuel in the storage tank.

4. A system as in claim 3 wherein the computer means comprises an interface means comprising:
   (a) a resistor means for converting the electrical current into an analog voltage, the value of which is indicative of the level of the liquid fuel in the storage tank; and
   (b) analog to digital conversion means for converting the analog voltage into a digital signal which can be processed by the computer means.

5. A system as in claim 1 wherein the means for measuring the temperatures at various locations in the boiler room comprises thermocouple devices located at the point at which the temperature is measured, which generate the second set of electrical signals indicative of the measured temperatures.

6. A system as in claim 5 wherein the thermocouple devices are comprised of:
   (a) a first thermocouple at the liquid fuel drawn from the storage tank;
   (b) a second thermocouple at the water resident in a boiler room;
   (c) a third thermocouple at the water drawn from the boiler for use as domestic hot water; and (d) a fourth thermocouple at the gases expelled from the boiler through a stack.

7. A system as in claim 6 wherein the second set of electrical signals is comprised of analog voltage signals.

8. A system as in claim 7 wherein the computer means comprises an interface means comprising analog to digital conversion means for converting the analog voltage signals into a set of digital signals which can be processed by the computer means.

9. A system as in claim 1 wherein the means for monitoring the operating status of the plurality of conventional boiler room equipment is through wires from electrical circuits of the equipment such that the wires are energized when the equipment is operating in one predetermined mode and de-energized when the equipment is operating in another predetermined mode.

10. A system as in claim 9 wherein the conventional boiler room equipment comprises:
(a) a fuel valve which controls the flow of the liquid fuel from a fuel pump to a burner;
(b) the burner which is connected to a boiler and which draws the liquid fuel from the fuel valve for ignition therein;
(c) a pressure controller which monitors pressure of steam generated in the boiler;
(d) a low water cutoff valve which monitors the level of water in the boiler; and
(e) a smoke alarm which monitors the quality of the gases expelled by the boiler.

11. A system as in claim 10 wherein the computer means comprises an interface mans comprising electrical relay means, said relay means generates a set of digital signals when the wires connected to the conventional boiler room equipment to the relay means are energized.

12. A system as in claim 1 wherein the means for transmitting the processed signals is a modem.

13. A system for automatically monitoring, processing, and storing operating parameters of a boiler room comprising:
(a) means for measuring temperatures at various locations in the boiler room wherein the means for measuring the temperatures comprises thermocouple wells located at the point at which the temperature is measured and generating a first set of electrical signals indicative of the temperatures;
(b) means for monitoring operating status of a plurality of conventional boiler room equipment and generating a second set of electrical signals indicative of the monitored operating status;
(c) computer means located in the boiler room for selecting electrical signals from the sets of electrical signals and internally processing and storing the selected electrical signals in accordance with a set of internally programmed instructions; and
(d) means for transmitting the processed signals stored in the computer means from the computer means located in the boiler room to a computer located in a remote location.

14. A system as in claim 13 wherein the means for monitoring the operating statusof the plurality of conventional boiler room equipment is through wires from electrical circuits of the equipment such that the wires are energized when the equipment is operating in one predetermined mode and de-energized when the equipment is operating in another predetermined mode.

15. A system as in claim 13 wherein the thermocouple devices are comprised of:

(a) a first thermocouple at the liquid fuel drawn from the storage tank;
(b) a second thermocouple at the water resident in a boiler room;
(c) a third thermocouple at the water drawn from the boiler for use as domestic hot water; and
(d) a fourth thermocouple at the gases expelled from the boiler through a stack.

16. A system as in claim 15 wherein the first set of electrical signals is comprised of analog voltage signals.

17. A system as in claim 16 wherein the computer means comprises an interface means comprising analog to digital conversion means for converting the analog voltage signals into a set of digital signals which can be processed by the computer means.

18. A system for automatically monitoring, processing, and storing operating parameters of a boiler from comprising:
(a) means for measuring temperatures at various locations in the boiler room and generating a first set of electrical signals indicative of the temperatures;
(b) means for monitoring operating status of a plurality of conventional boiler room equipment and generating a second set of electrical signals indicative of the monitored operating status;
(c) computer means located in the boiler room for selecting from a plurality of electrical signals and internally processing and storing the selected electrical signals in accordance with a set of internally programmed instructions; and
(d) means for transmitting the processed signals stored in the computer means from the computer means located in the boiler room to a computer located in a remote location; wherein the means for measuring the temperatures at various locations in the boiler room comprises thermocouple devices located at the point at which the temperature is measured; wherein the means for monitoring the operating status of the plurality of conventional boiler room equipment comprises the connection of wires to electrical circuits of the equipment such that the wires are energized when the equipment is operating in one predetermined mode and de-energized when the equipment is operating in another predetermined mode, and the conventional boiler room equipment comprises:
(1) a fuel valve which controls the flow of the liquid fuel from a fuel pump to a burner;
(2) the burner which is connected to a boiler and which draws the liquid fuel from the fuel valve for ignition therein;
(3) a pressure controller which monitors pressure of steam generated in the boiler;
(4) a low water cutoff valve which monitors the level of water in the boiler; and
(5) a smoke alarm which monitors the quality of the gases expelled by the boiler.

19. A system as in claim 18 wherein the computer means comprises an interface means comprising electrical relay means wherein the relays generate a set of digital signals when the wires connected to the conventional boiler room equipment are energized.

20. A system for detecting the level of liquid in a storage tank comprising:
(a) means for transmitting an ultrasonic signal in a direction generally perpendicular to the surface of the liquid the storage tank;

(b) means for detecting an echo of the transmitted ultrasonic signal from the surface level of the liquid in the storage tank;

(c) means for electrically measuring a time differential between transmission of the ultrasonic signal and the detection of the echo of the ultrasonic signal;

(d) means for generating an electrical signal indicative of the level of the liquid fuel in the storage tank in accordance with the measured time differential;

(e) a chamber above the top of the storage tank in communication with the storage tank; and (f) means for mounting the transmitting means and detecting means in communication with the liquid in the storage tank at a predetermined distance above the top of the storage tank within said chamber whereby the transmitting means and detecting means do not come into contact with the liquid in the storage tank at any time.

21. A system as in claim 20 wherein the electrical signal consists of the electrical current the value of which is indicative of the level of the liquid in the storage tank.

22. A system as in claim 21 further comprising:

(a) a resistor means for converting the electrical current into an analog voltage, the value of which is indicative of the level of the liquid in the storage tank; and (b) analog to digital conversion means for converting the analog voltage into a digital signal.

23. A system as in claim 22 further comprising a computer means for storing and processing the digital signal in accordance with a set of internally programmed instructions.

24. A system as in claim 23 further comprising means for transmitting the processed signals stored in the computer means from the computer means to a second computer located in a remote location.

25. A system as in claim 24 wherein the means for transmitting is a modem.

26. A system as in claim 20 wherein the means for mounting the transmitting means and detecting means comprises a mounting plate, means for fastening the mounting plate to a pre-cut manhole opening located on the top of the storage tank, which manhole opening comprises said chamber above the top of the storage tank and wherein the transmitting and detecting means attaches to said mounting plate.

27. A system as in claim 20 wherein the predetermined distance above the storage tank is approximately ten inches or less.

* * * * *